Oct. 23, 1951 S. J. HAEFNER ET AL 2,572,024
DEVICE FOR GENERATING MULTIPLE SIGNALS OF DIFFERENT FREQUENCIES
Filed March 26, 1948
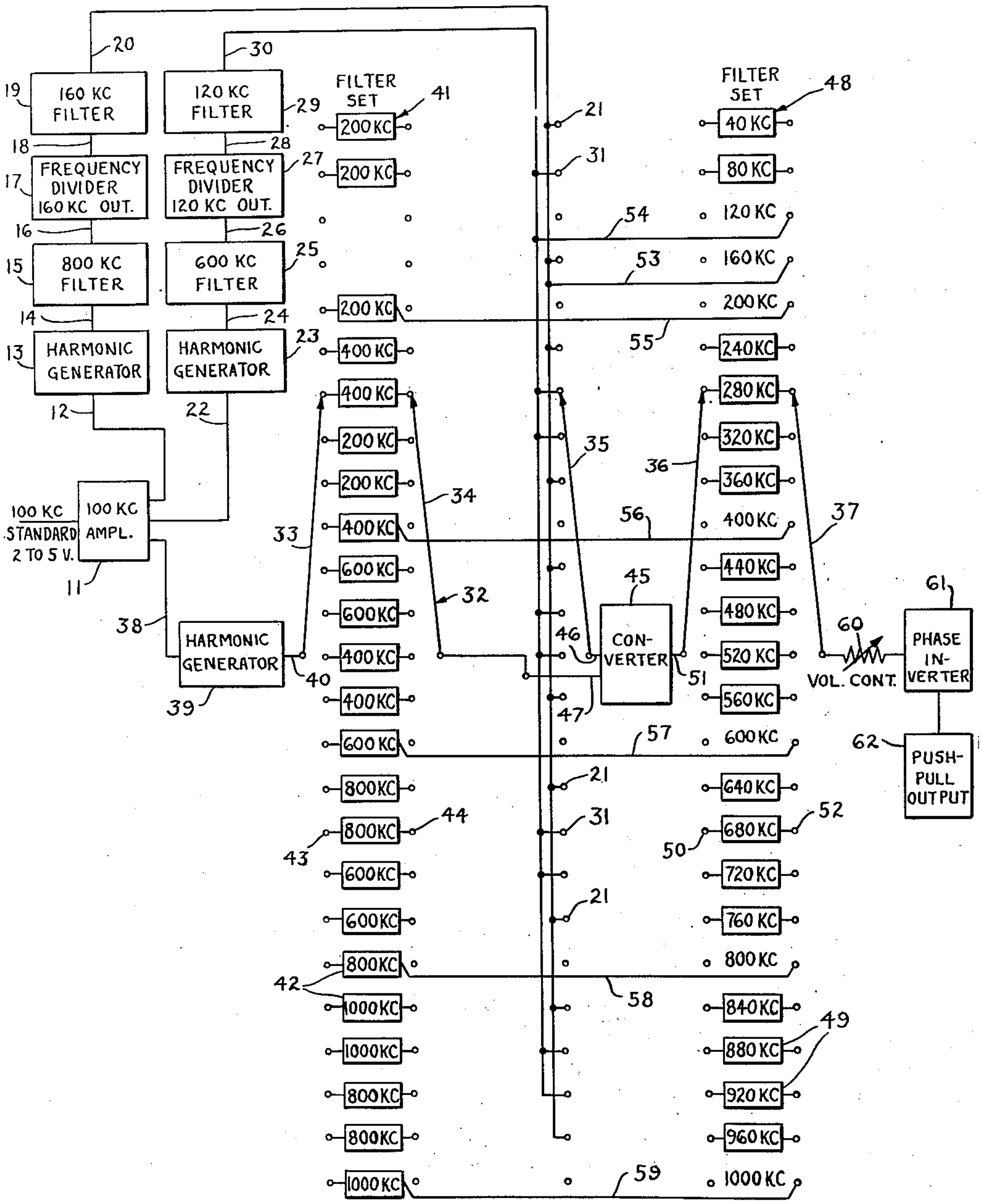
INVENTOR.
SYLVESTER J. HAEFNER
RAYMOND H. SMITH
BY M. O. Hayes
ATTORNEY Patented Oct. 23, 1951

2,572,024

UNITED STATES PATENT OFFICE 2,572,024

DEVICE FOR GENERATING MULTIPLE SIGNALS OF DIFFERENT FREQUENCIES

Sylvester J. Haefner, New London, and Raymond H. Smith, Oakdale, Conn.

Application March 26, 1948, Serial No. 17,361

1 Claim. (Cl. 250—36)

(Granted under the act of March 3, 1883, as amended April 30, 1928; 370 O. G. 757)

The present invention concerns a device for generating multiple output signals of different standard frequencies from a single input signal derived from an external source. In particular the invention concerns a device of this type in which frequency multiplying and dividing components are used in conjunction with a converter for adding and subtracting frequencies to generate a multiplicity of accurate standard output frequencies from an accurate input frequency derived from an external source.

The device is useful for investigating crystals in connection with underwater sound research requiring the generation of a range of signals of accurate standard frequencies in order that examination of the crystals can be made under a sweep of accurate standard frequencies.

In preferred form the device includes as components for multiplying frequencies a first harmonic generator and a second harmonic generator each adapted to be energized individually by the input frequency and adapted to provide output frequencies that are harmonics of the input frequency. The outputs from the harmonic generators are fed individually through filters to frequency dividers which provide subharmonic output frequencies that are different from each other and each of which is a fractional part of the divider input frequency. A third harmonic generator is adapted to be energized by the input frequency and to provide output frequencies that are harmonics of its input frequency. There is provided a first filter set in which the different filter members have different frequency characteristics corresponding to the output frequencies of the third harmonic generator. A converter component is provided for combining input signals by addition and subtraction of frequencies. There is also provided a second filter set in which the different filter members have different frequency characteristics corresponding to the output frequencies of the converter. A selector switch is provided to connect the converter output through a selected filter of the second filter set to the output of the device, simultaneously to connect the converter input through a corresponding selected filter of the first filter set to the harmonic output of the third generator, and simultaneously to connect the converter input with a subharmonic output selected from the first generator and the second generator. When the selector switch is actuated by an operator to select a particular desired output frequency, the switch automatically connects the frequency multiplying and dividing components with the converter component for adding and subtracting frequencies so that the desired output frequency is generated.

In preferred form the device is energized by an accurate input signal having a frequency of 100 kc. obtained from an external signal source. The input 100 kc. frequency is multiplied and divided by the harmonic generators and frequency dividers and the multiples and submultiples are added and subtracted by the converter so as to obtain frequencies from 40 kc. to 1,000 kc. in 40 kc. steps. The preferred input frequency of the device and the output frequency and range of the device are not critical and other frequencies can be used if desired. The device is adapted for use with an interpolation oscillator furnishing frequencies from 10 kc. to 50 kc. so that a continuous frequency range from 40 kc. to 1,000 kc. is available. Harmonic distortion from the generator is not greater than 1.0 percent and accuracy of the output frequency is dependent solely on the accuracy of the input frequency.

An object of the invention is to provide a device for generating multiple signals of different standard frequencies.

Another object is to provide a device of this type in which frequency multiplying and dividing components are used in conjunction with a converter for adding and subtracting frequencies to generate a multiplicity of accurate standard output frequencies from an accurate input frequency derived from an external signal source.

Another object is to provide a device of this type having three harmonic generators for multiplying input frequencies, two subharmonic frequency dividers for dividing frequencies, and a converter for adding and subtracting the multiple and submultiple frequencies.

Further objects and advantages of this invention, as well as its construction, arrangement and operation will be apparent from the following description and claims, in which, The simple figure is a diagrammatic view of a preferred embodiment of the invention.

There is shown a buffer amplifier 11 adapted to amplify a signal of 100 kc. frequency from an external source (not shown). Buffer amplifier 11 is of any type conventional in the art for amplifying signals of the frequency indicated. Use of a frequency of 100 kc. is not critical and a different frequency can be used if desired.

From buffer amplifier 11 a first 100 kc. signal is fed at 12 to harmonic generator 13 which is a frequency multiplying component adapted to generate the eighth harmonic of its 100 kc. input signal and thus provide an 800 kc. output signal. Harmonic generator 13 is of any type conventional in the art for generating a harmonic output signal of the indicated frequency from an input signal of the indicated frequency. Use of the eighth harmonic is not critical and a different harmonic can be used if desired. From harmonic generator 13 the 800 kc. signal is fed at 14 to 800 kc. filter 15. Filter 15 is of any type conventional in the art for filtering signals of the frequency indicated and its frequency characteristics are correlated with the output frequency characteristics of harmonic generator 13. From filter 15 the 800 kc. signal is fed at 16 to a frequency divider 17 which is a frequency dividing component adapted to generate a subharmonic signal having one-fifth the frequency of the 800 kc. harmonic input or an output frequency of 160 kc. Frequency divider 17 is of any type conventional in the art for generating a signal of the subharmonic frequency indicated. Use of the one-fifth subharmonic is not critical and a different subharmonic can be used if desired. From frequency divider 17 the 160 kc. signal is fed at 18 to 160 kc. filter 19. Filter 19 is of any type conventional in the art for filtering signals of the frequency indicated and its frequency characteristics are correlated with the output frequency characteristics of frequency divider 17. From filter 19 the 160 kc. signal is fed at 20 to switch contacts 21.

From buffer amplifier 11 a second 100 kc. signal is fed at 22 to harmonic generator 23, similar to harmonic generator 13, but adapted to generate the sixth harmonic of its 100 kc. input signal and thus provide a 600 kc. output signal. Use of the sixth harmonic is not critical and a different harmonic can be used if desired. From harmonic generator 23 the 600 kc. signal is fed at 24 to 600 kc. filter 25 similar to filter 15 but adapted for a frequency of 600 kc. The frequency characteristics of filter 25 are correlated with the output frequency characteristics of harmonic generator 23. From filter 25 the 600 kc. signal is fed at 26 to frequency divider 27, similar to frequency divider 17, but adapted to generate a subharmonic signal having one-fifth the frequency of the 600 kc. harmonic input or an output frequency of 120 kc. Use of the one-fifth subharmonic is not critical and a different subharmonic can be used if desired. From frequency divider 27 the 120 kc. signal is fed at 28 to 120 kc. filter 29, similar to filter 19, but adapted for a frequency of 120 kc. The frequency characteristics of filter 29 are correlated with the output frequency characteristics of frequency divider 27. From filter 29 the 120 kc. signal is fed at 30 to switch contacts 31.

Switch contacts 21 and 31 are adapted to be selectively engaged by blade 35 of a switch 32, which also includes blades 33, 34, 36 and 37. Switch blades 33, 34, 35, 36 and 37 are ganged together for simultaneous operation.

From buffer amplifier 11 a third 100 kc. signal is fed at 38 to harmonic generator 39 adapted to generate the second, fourth, sixth, eighth and tenth harmonics of its 100 kc. input signal and thus provide 200 kc., 400 kc., 600 kc., 800 kc. and 1,000 kc. output signals. Harmonic generator 39 is of any type conventional in the art for generating harmonic output signals of the frequencies indicated from an input signal of the frequency indicated. Use of the indicated harmonics is not critical and other harmonics can be used if desired. The output signal from harmonic generator 39 is fed at 40 to the blade 33 of switch 32.

There is provided a first filter set 41 comprising a plurality of individual filter members 42 adapted to filter frequencies of 200 kc., 400 kc., 600 kc., 800 kc. and 1,000 kc. Filter members 42 are of any type conventional in the art for filtering signals of the frequencies indicated and the frequency characteristics of members 42 are correlated with the output frequency characteristics of harmonic generator 39. Filter members 42 at their inputs are connected with switch contacts 43 adapted to be selectively engaged by switch blade 33 and filter members 42 at their outputs are connected to contacts 44 adapted to be selectively engaged by switch blade 34.

There is provided a converter 45 of any type conventional in the art for combining a plurality of input signals by addition and substraction of frequencies to provide a combined output signal. The input of converter 45 is adapted to receive a signal of subharmonic frequency selected from either filter 19 or 29 through contacts 21 or 31, respectively, switch blade 35, and input feed 46. The input of converter 45 is also adapted to receive a signal of harmonic frequency from a selected filter member 42 through switch blade 34 and input feed 47. The frequencies of the subharmonic signals from filters 19 and 29 and the harmonic signal from selected filter member 42 are such that when a signal selected from either filter 19 or 29 and a signal from selected filter member 42 are fed together into converter 45 there is provided by addition and subtraction of frequencies an output signal of desired frequency. A range of output signal frequencies is thus obtained from converter 45 by selection of the input frequency from either filter 19 which has one frequency or filter 29 which has a different frequency and also by selection of a single input frequency from among the plurality available from filter members 42.

The frequencies available from converter 45 are 40 kc., 80 kc., 240 kc., 280 kc., 320 kc., 360 kc., 440 kc., 480 kc., 520 kc., 560 kc., 640 kc., 680 kc., 720 kc., 760 kc., 840 kc., 880 kc., 920 kc. and 960 kc. These frequencies are obtained from the input signals as indicated in the following table:

| Output Frequency (kc.) | = | Input Frequency (kc. from Filter Set 41) | + − | Input Frequency (kc. from Filter 19 or Filter 29) |
|---|---|---|---|---|
| 40 | = | 200 | − | 160 |
| 80 | = | 200 | − | 120 |
| 240 | = | 400 | − | 160 |
| 280 | = | 400 | − | 120 |
| 320 | = | 200 | + | 120 |
| 360 | = | 200 | + | 160 |
| 440 | = | 600 | − | 160 |
| 480 | = | 600 | − | 120 |
| 520 | = | 400 | + | 120 |
| 560 | = | 400 | + | 160 |
| 640 | = | 800 | − | 160 |
| 680 | = | 800 | − | 120 |
| 720 | = | 600 | + | 120 |
| 760 | = | 600 | + | 160 |
| 840 | = | 1000 | − | 160 |
| 880 | = | 1000 | − | 120 |
| 920 | = | 800 | + | 120 |
| 960 | = | 800 | + | 160 |

There is provided a filter set 48 comprising a plurality of individual filter members 49 adapted to filter the output frequencies of converter 45. The indicated output frequencies are not critical and other output frequencies can be provided if desired by using other input frequencies than those indicated.

Filter members 49 are of any type conventional in the art for filtering signals of the frequencies indicated and the frequency characteristics of members 49 are correlated with the output frequency characteristics of converter 45. Filter members 49 at their inputs are connected with switch contacts 50 adapted to be selectively engaged by switch blade 36 which is connected with the output of converter 45 at 51. Filter members 49 at their outputs are connected to switch contacts 52 adapted to be selectively engaged by switch blade 37.

In addition to switch contacts 52 which are arranged to provide from converter 45 signals of the frequencies indicated in the table above, other contacts 52 are connected as indicated at 53 and 54 to provide frequencies of 160 kc. and 120 kc. from filters 19 and 29, respectively. Other contacts 52 are connected at 55, 56, 57, 58 and 59 to provide frequencies of 200 kc., 400 kc., 600 kc. 800 kc. and 1,000 kc., respectively, from filter set 41. Switch contacts 52 are thus connected to provide available frequencies from 40 kc. to 1,000 kc. in steps of 40 kc.

The switch blade 37 is connected through a volume control 60 and a phase inverter 61 to an outlet connection 62 for the device. Volume control 60 and phase inverter 61 are of any type conventional in the art for use with signals of the indicated frequencies.

In operation buffer amplifier 11 is connected to an external accurate frequency source and in the preferred form of invention this is a source of accurate 100 kc. frequency. Switch 332 is actuated by an operator to bring blade 37 into engagement with a selected contact 52 providing the desired outlet frequency. Because the blades of switch 32 are ganged together, actuation of blade 37 causes simultaneous actuation of blades 33, 34, 35 and 36 which are brought into engagemnet with selected contacts 43, 44, 21 or 31, and 50 corresponding with the selected contact 52. If the desired frequency is one of those in the preceding table, switch 32 is automatically positioned so that there are fed into converter 45 selected signals that are combined into an output signal having the desired frequency. If the desired frequency is 120 kc., 160 kc., 200 kc., 400 kc., 600 kc., 800 kc. or 1,000 kc., switch 32 does not pass signals into converter 45 but instead connects the device outlet 62 directly with filter 19, filter 29 or filter set 41.

The device of this invention thus provides at its outlet 62 available frequencies in a range from 40 kc. to 1,000 kc. in steps of 40 kc. The available harmonic frequencies are provided by harmonic generator 39 which multiplies frequencies. The available subharmonic frequencies are provided by harmonic generator 13 and frequency divider 17 or by harmonic generator 23 and frequency divider 27 which multiply and divide frequencies to produce submiltiple frequencies. Other frequencies are provided by converter 45 which adds and subtracts the multiple and submultiple frequencies.

Energization of the device is from an external signal source providing an accurate input frequency so that if the input frequency fails the output of the device falls to zero, providing conventional harmonic generators and frequency dividers are used whose output disappears when their input signals are removed. It is impossible for the device to be self-energized and therefore it is impossible for off-frequency operation to occur upon failure of the input frequency.

Accuracy of the output frequencies is dependent solely upon accuracy of the input frequency from the external signal source. Harmonic distortion is not greater than 1.0 percent.

It is understood that various modifications and changes may be made in this invention without departing from the spirit and scope thereof as set forth in the appended claim.

The invention described herein may be manufactured and used by or for the Government of the United States of America for governmental purposes without the payment of any royalties thereon or therefor.

What is claimed is:

Apparatus for generating multiple signals of different standard frequencies, said apparatus comprising a source of a single standard-frequency signal, first generator means including a harmonic generator and a frequency divider serially connected thereto for producing a signal of a first frequency inharmonically related to that of the standard signal, second generator means including a harmonic generator and a frequency divider serially connected thereto for producing a signal of a second frequency inharmonically related to that of the standard signal, third generator means for producing a plurality of signals of different frequencies harmonically related to the standard signal, filter means selectively connectible to said third generator means and including a plurality of filters of frequencies corresponding to the frequencies of the third generator means, converter means, and means individually connecting each of the first and second generator means and the filter means to said converter means, whereby to provide resultant signals of frequency values mutually separated by a predetermined fixed difference-frequency value inharmonically related to said standard-frequency signal.

SYLVESTER J. HAEFNER.
RAYMOND H. SMITH.

REFERENCES CITED

The following references are of record in the file of this patent:

UNITED STATES PATENTS

| Number | Name | Date |
|---|---|---|
| 2,231,634 | Monk | Feb. 11, 1941 |
| 2,383,005 | Marks | Aug. 21, 1945 |
| 2,445,664 | Doelz | July 20, 1948 |